(12) United States Patent
Bratton

(10) Patent No.: US 6,417,667 B1
(45) Date of Patent: Jul. 9, 2002

(54) METHOD FOR LOGGING AND DETERMINING WELLBORE DIAMETER BY PROCESSING OF PROGRESSIVE SUBSURFACE ELECTROMAGNETIC RESISTIVITY MEASUREMENTS

(75) Inventor: Tom R. Bratton, Kingwood, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/695,198

(22) Filed: Oct. 24, 2000

(51) Int. Cl.$^7$ .............. G01V 3/30; G01V 3/38
(52) U.S. Cl. .......................... 324/338; 702/7
(58) Field of Search ................ 324/338–344, 324/356, 364; 702/6, 7, 10, 11, 12, 13

(56) References Cited

U.S. PATENT DOCUMENTS

| 4,899,112 | A |   | 2/1990 | Clark et al. | 324/338 |
|---|---|---|---|---|---|
| 4,916,400 | A |   | 4/1990 | Best et al. | 324/338 |
| 4,964,085 | A |   | 10/1990 | Coope et al. | 367/35 |
| 4,968,940 | A |   | 11/1990 | Clark et al. | 324/338 |
| 5,869,968 | A | * | 2/1999 | Brooks et al. | 324/338 |
| 5,900,733 | A |   | 5/1999 | Wu et al. | 324/338 |

* cited by examiner

Primary Examiner—Edward Lefkowitz
Assistant Examiner—Reena Aurora
(74) Attorney, Agent, or Firm—John J. Ryberg; Brigitte L. Jeffery; Victor H. Segura

(57) ABSTRACT

A method is disclosed for determining a diameter of a wellbore. The method includes inducing an electromagnetic field in the wellbore and a formation surrounding the wellbore from a first location along the wellbore. At a first time, a phase is measured, with respect to the field at the first location, of a signal induced by the electromagnetic field at a second and at a third location axially spaced apart from the first location and from each other. The measuring is repeated at a second time, and a resistivity of the formation, and the wellbore diameter at the first time and at the second time are determined from the measurements of phase made at the first and at the second times. Any ambiguity in the resistivity is resolved by using resistivity determined from the measurements made at the first time.

15 Claims, 4 Drawing Sheets

METHOD FOR LOGGING AND DETERMINING WELLBORE DIAMETER BY PROCESSING OF PROGRESSIVE SUBSURFACE ELECTROMAGNETIC RESISTIVITY MEASUREMENTS

FIELD OF THE INVENTION

The invention is related to the field of electromagnetic propagation resistivity well logging. More specifically, the invention is related to methods for processing phase and amplitude measurements made by an electromagnetic propagation resistivity well logging instrument to determine wellbore diameter.

BACKGROUND OF THE INVENTION

Well logging techniques known in the art include logging-while-drilling ("LWD"). LWD includes attaching a logging instrument disposed in a drill collar to a drilling assembly while a wellbore is being drilled through earth formations. Measurements made by the instrument can be transmitted to the earth's surface by various forms of telemetry, and/or can be recorded in a storage device in the logging instrument for retrieval and processing after the logging instrument is withdrawn from the wellbore.

One type of well logging instrument adapted for LWD, called an electromagnetic propagation resistivity instrument, is described in U.S. Pat. No. 4,899,112 issued to Clark et al, and in U.S. Pat. No. 4,968,940 issued to Clark et al. This instrument makes measurements of electrical resistivity of the earth formations surrounding the wellbore. Generally speaking, the instrument described in these two patents makes measurements of resistivity by generating an electromagnetic field in the earth formations at a transmitter location on the instrument, and determining the phase and amplitude of the electromagnetic field at two or more receiver locations on the instrument. The change in phase and relative amplitude between the signals detected at the receiver locations corresponds to the electrical resistivity.

As explained in the Clark et al '112 and '940 patents, the measurement of phase difference is related to the resistivity at a radially closer distance to the wellbore than is the measurement of relative amplitude. As a result of having more than one radial depth of investigation measurement at each instrument position, it has been shown to be possible to generate a radial resistivity profile of the wellbore and earth formations surrounding the instrument. U.S. Pat. No. 4,964,085 issued to Coope et al, for example, describes a method for determining the caliber (diameter) of the wellbore by processing the phase and amplitude measurements made by an electromagnetic propagation logging instrument.

Another method for generating a radial resistivity profile is described in U.S. Pat. No. 5,900,733 issued to Wu et al. This technique is particularly useful where a plurality of transmitter/receiver spacings are available on a particular logging instrument. Generally speaking, the method described in the Wu et al '733 patent includes generating an initial model of the earth formations, the model including formation layers each having a selected axial thickness and resistivity. The resistivity may be laterally segregated into two or more zones with respect to distance from the axial center of the logging instrument and wellbore. Based on the initial model, a theoretical response of the logging instrument is calculated. The theoretical response of the instrument is compared to the actual response measured in the wellbore. If the difference between the theoretical and measured responses exceeds a selected threshold, the model is adjusted, and a new theoretical response is calculated. The model adjustment, theoretical response calculation and comparison is continued until the difference falls below the selected threshold. The extant model is determined to be the most likely distribution of resistivity in the vicinity of the wellbore.

Another technique for determining wellbore diameter is described in U.S. Pat. No. 4,916,400 issued to Best et al. This technique uses a measure of the difference in phase between a transmitted electromagnetic wave and a signal detected therefrom propagated through a wellbore and earth formations. The phase difference measure can be quantified by a sum of phase differences (called "phase sum") between the transmitted wave at each of two receivers on the logging instrument, or alternatively can be represented by an average of the phase differences between the transmitted wave and the detected signal at a plurality of receivers. For any predetermined value of resistivity of fluid in the wellbore, the phase sum is correlated to a measurement of difference in phase between the receivers ("phase shift") to determine both the resistivity of the earth formation surrounding the wellbore and the diameter of the wellbore.

Under certain conditions, however, techniques such as described in the Coope et al '085 patent and the Wu et al '733 patent do not result in a unique solution for resistivity profile and wellbore diameter. More than one combination of wellbore diameter and formation resistivity distribution may generate a theoretical instrument response that closely matches the measured instrument response. Further, the method described in the Best et al '400 patent can produce highly uncertain results under a variety of wellbore conditions, including large wellbore diameters.

What is needed is a technique for determining resistivity profile and wellbore diameter which can resolve cases where different combinations of resistivity profile and wellbore diameter result in the same instrument response.

SUMMARY OF THE INVENTION

One aspect of the invention is a method is for determining a diameter of a wellbore using electromagnetic propagation measurements. The method includes inducing an electromagnetic field in the wellbore and in an earth formation surrounding the wellbore from a first location along the wellbore. At a first time, a phase is measured, with respect to the electromagnetic field at the first location, of a signal induced by the electromagnetic field at a second and at a third location axially spaced apart from the first location and axially spaced apart from each other. The measuring is then repeated at a second time. A resistivity of the formation, and the wellbore diameter at the first time and at the second time are determined from the measurements of phase made at the first and at the second times. Any ambiguity in the resistivity is resolved by using resistivity determined from the measurements made at the first time.

In one embodiment, the resistivity and wellbore diameter are determined by calculating a phase difference between the signals detected at the second and at the third locations, and calculating a phase sum between the signals measured at the second and third locations. In another embodiment, the phase sum is substituted by a phase average of the phase measurements made at the second and the third locations.

BRIEF DESCRIPTION OF THE DRAWINGS

Other aspects and advantages of the invention will become apparent upon reading the following detailed description and upon reference to the drawings in which.

DETAILED DESCRIPTION OF SPECIFIC EMBODIMENTS

Figure 1:
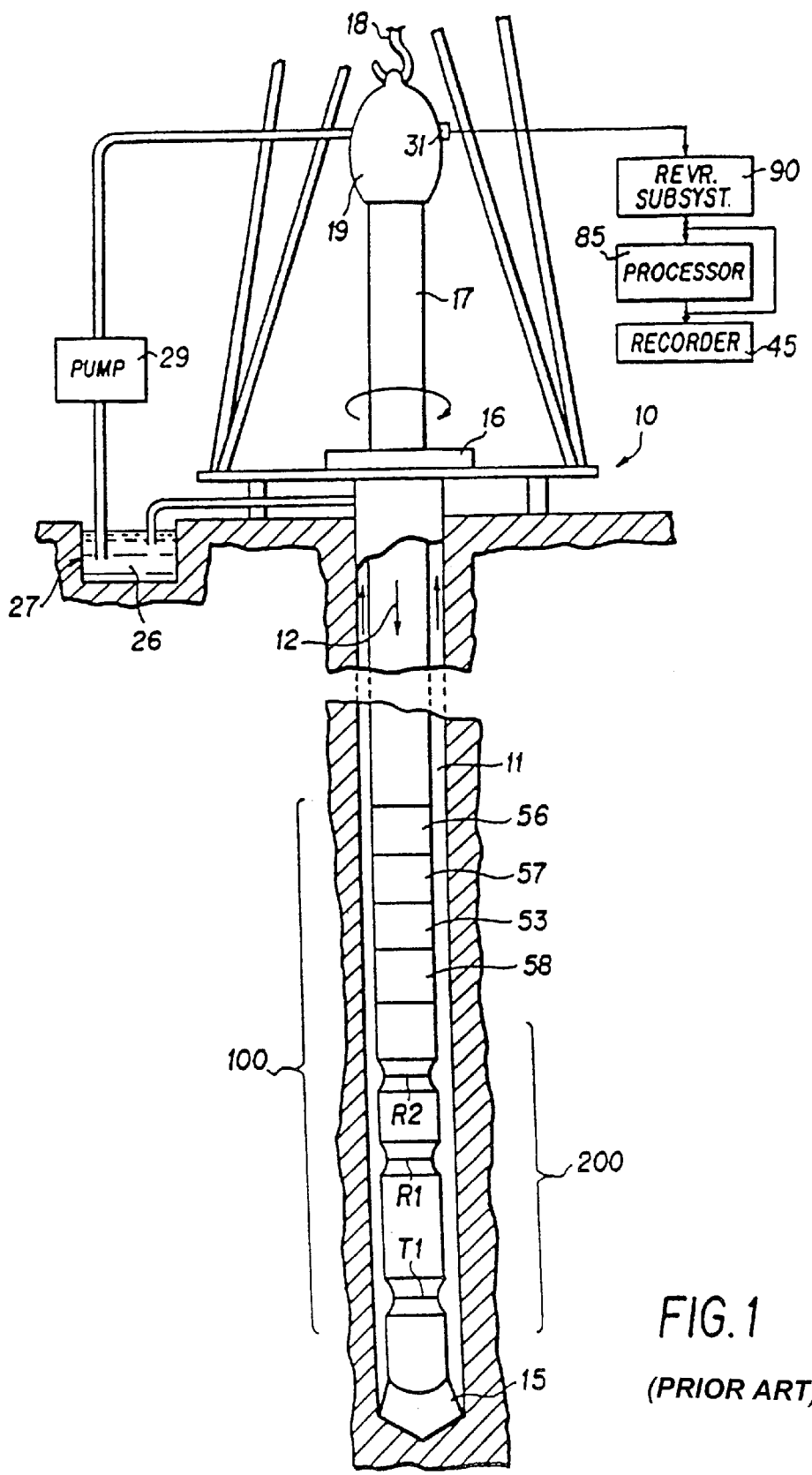
FIG. 1 shows an example of a logging while drilling apparatus than can be used with a method according to the invention.

FIG. 1 shows an example of a logging while drilling (LWD) apparatus that can be used with a method according to the invention. A drilling rig 10 is used to drill a wellbore 11 through earth formations. The rig 10 drills by rotating a drill string 12 in the wellbore 11. The drill string 12 has a drill bit 15 attached to its lower end. The drill string 12 is rotated by a rotary table 16, which engages a kelly 17 at the upper end of the drill string 12. The drill string 12 is raised from and lowered into the wellbore by a hook 18 attached to a traveling block (not shown). The kelly 17 is coupled to the hook 18 by a swivel 19, which permits rotation of the kelly 17 and the drill string 12 relative to the hook. Fluid called "drilling mud" 26 is pumped by a mud pump 29 from a storage tank or pit 27 into the drill string 12 through the swivel 19. The mud 26 passes through the center of the drill string 12 outwardly from "jets" or "nozzles" (not shown) in the bit 15 whereupon the mud 26 returns to the surface (and ultimately the tank 27) in an annular space external to the drill string 12 in the wellbore 11. Arrows in FIG. 1 indicate the direction of mud flow.

An LWD measuring and communications system 100 is coupled into the drill string, preferably near the bit 15. The LWD system 100 includes an electromagnetic propagation resistivity sensor subsystem 200, which should include at least one transmitter antenna T1 and axially spaced apart therefrom along the axis of the LWD system 100, two receiver antennas R1, R2 (or alternatively includes at least one receiver and two transmitters). The LWD system 100 may include a telemetry transmitter 56 which modulates the pressure of the drilling mud 26 as it flows through the drill string 12 so that signals corresponding to measurements made by the LWD system 100 can be transmitted to the earth's surface through the mud 26. The modulation signal sent by the telemetry transmitter 56 is detected at the surface by a pressure transducer 31. The transducer converts the mud pressure signal into an electrical signal for decoding and interpretation in a surface receiver system 90. The decoded signals can be processed and recorded in a processor 85 and recorder 45, respectively, disposed at the earth's surface.

The telemetry transmitter 56 is controlled by a telemetry processor 57, which includes circuitry (not shown separately in FIG. 1), for converting signals sent from the sensor subsystem 200 into digital signals used to control the telemetry. The type of telemetry used in this embodiment is known in the art as phase shift keying (PSK), however it is to be clearly understood that the type of telemetry used in any particular embodiment is not intended to limit the invention.

The LWD system also may include an acquisition processor 58. This processor may include a clock, memory central processor and associated circuitry used to operate the sensor subsystem and to acquire and store data from various sensors in the LWD system 100, including those in the sensor subsystem 200. Power to operate the LWD system 100 may be provided by a battery 53 or by mud flow powered turbine (not shown) of any type known in the art for use with LWD systems.

Figure 2:
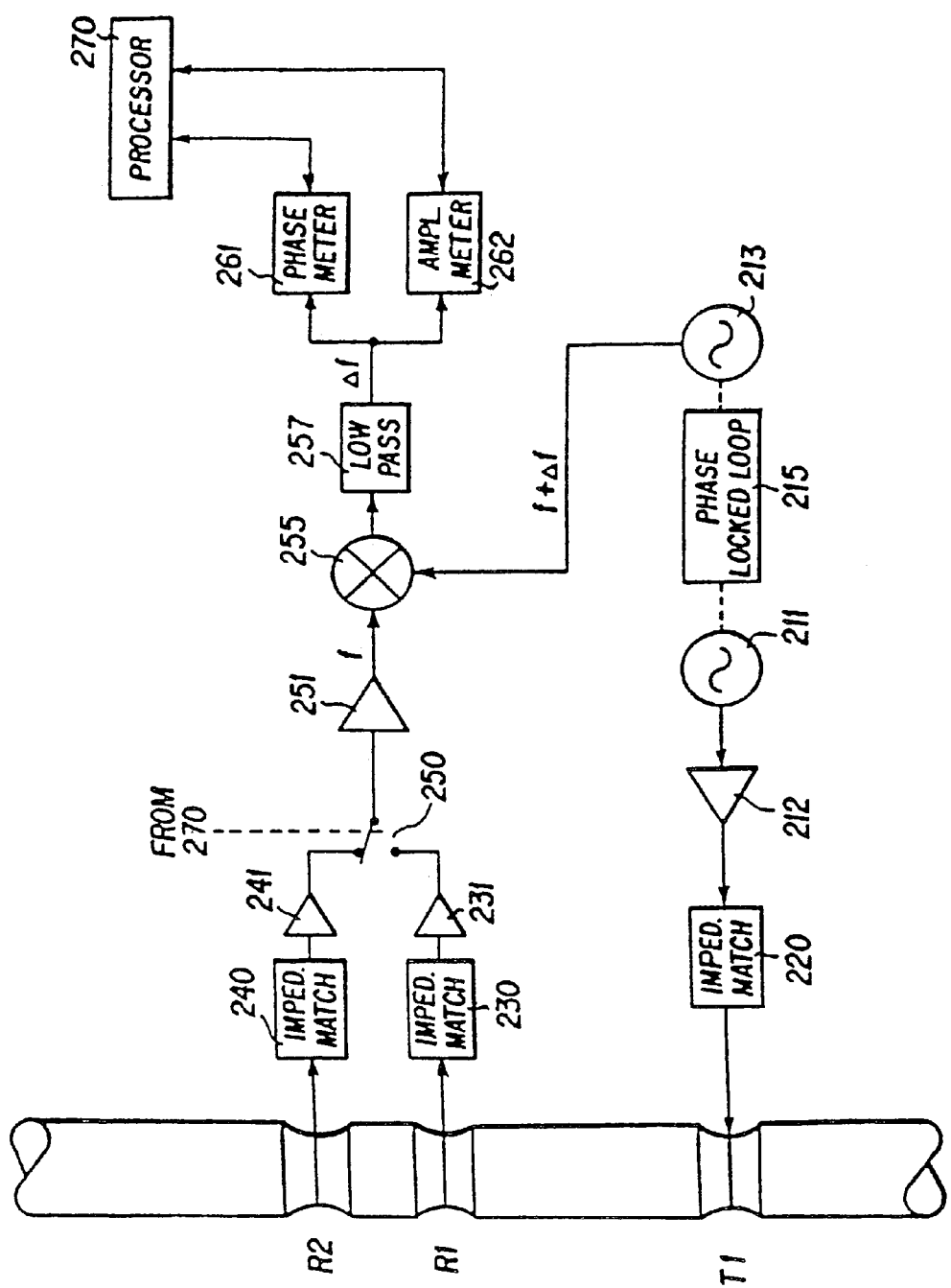
FIG. 2 shows a sensor portion of the example apparatus of FIG. 1 in more detail.

The sensor system 200, and circuits in the acquisition processor 58, are shown in more detail in FIG. 2. An oscillator 211 generates an alternating current at a selected frequency f, which is conducted to an amplifier 212. The amplified alternating current is applied to an impedance matching circuit 230 to transmitter antenna T1. This results in an electromagnetic field being induced in the wellbore and the formations surrounding the sensor system 200. Signals detected in receiver antenna R1, as a result of the electromagnetic field, are applied to one input of a switch 250. Signals detected by receiver antenna R2 are applied to the other input of the switch 250. The switch 250 is controlled by central processor 270 to select as input either the signals from R1 or R2. The output of the switch is applied to preamplifier 251 and is subsequently demodulated to a lower frequency $\Delta f$ by heterodyning using a local oscillator 213 tied through a phase locked loop 215 to the oscillator 211. The heterodyned signal is applied to a mixer 255 and is then conducted to a low pass filter 257. The phase and amplitude information in the received signals are present in the output of the low pass filter 257. This information can be demodulated from the low pass filtered signal by a phase meter 261 and amplitude meter 262 of types well known in the art. As previously explained, the processor 270 may include local storage or memory, as well as circuits to conduct the phase and amplitude information to the telemetry processor (57 in FIG. 1).

Figure 3:
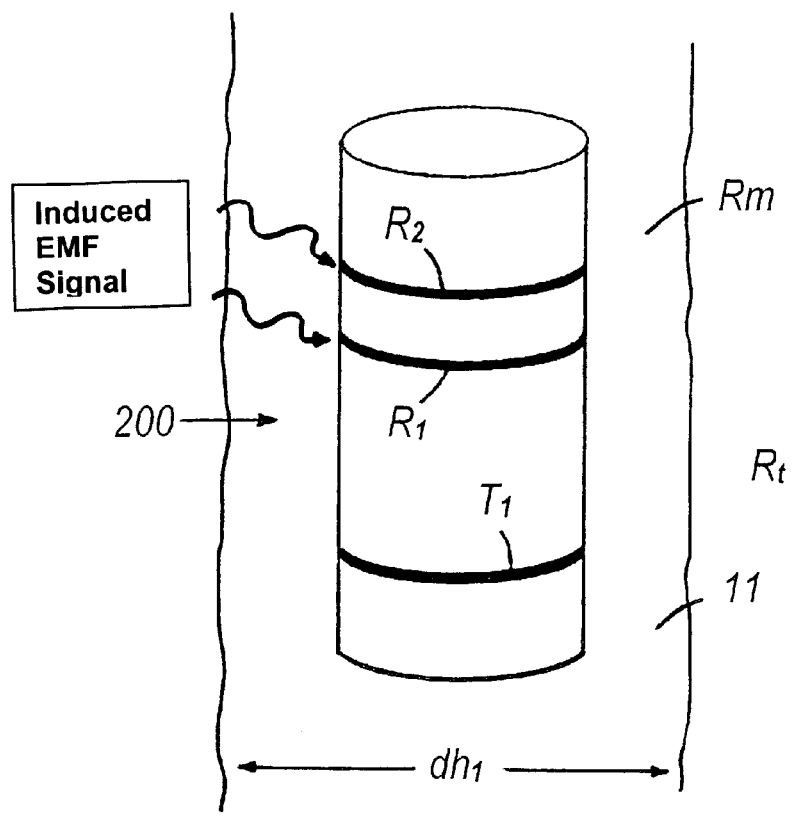
FIG. 3 shows the sensor portion of FIG. 2 in a wellbore having a first diameter.

Having shown an example of an apparatus, which will work with a method according to the invention, particular embodiments of a method according to the invention will now be explained. FIG. 3 shows the sensor system 200 disposed in the wellbore 11 in an earth formation 9 having electrical resistivity Rt. For purposes of this embodiment of the invention, it is assumed that the earth formation 9 is relatively impermeable to fluid flow, and therefore has a substantially uniform electrical resistivity with respect to the lateral distance from the center of the wellbore 11. A fluid (which can be "drilling mud") disposed in the wellbore 11 has an electrical resistivity Rm. As is known in the art, some types of drilling mud have oil or the like as a continuous phase, and are therefore substantially non-electrically conductive. When an embodiment of the invention is used in cases where the mud is substantially non-conductive, a value such as 1,000 ohm-m (0.001 mS/m conductivity) may be substituted for the value of Rm. Otherwise, methods for determining Rm of conductive fluids are well known in the art. In FIG. 3, the wellbore 11 has a diameter $dh_1$ which is normally at least the diameter of the drill bit (15 in FIG. 1), but may be somewhat larger depending on how much fluid-induced erosion of the wall of the wellbore has taken place. In a method according to the invention, an electromagnetic wave is induced by the current flowing through the at least one transmitter T1 and signals induced by the field in receivers R1 and R2 are detected. In one embodiment, a phase of the detected signals at R1 and R2 with respect to the transmitted electromagnetic field from T1 are measured. In this embodiment, the sum of the phase measurements (phase sum) is determined. At substantially the same time, a difference in phase between the signals detected at R1 and R2 (phase difference) is determined. Alternatively, an average of the detected signal phase at R1 and R2 (average phase), with respect to the transmitted field from T1, can be determined.

The diameter of the wellbore $dh_1$ and the value of formation resistivity Rt are then determinable from the phase sum (or average phase) and phase difference using a technique such as described in U.S. Pat. No. 4,916,400 issued to Best et al. Typically the measurements of phase difference and phase sum will be made during the original drilling of the wellbore 11, that is, directly after the bit (15 in FIG. 1) has first drilled through the formation 9. However, the invention is not limited as to the particular time at which these first phase shift and phase sum (or phase average) measurements are made.

Figure 4:
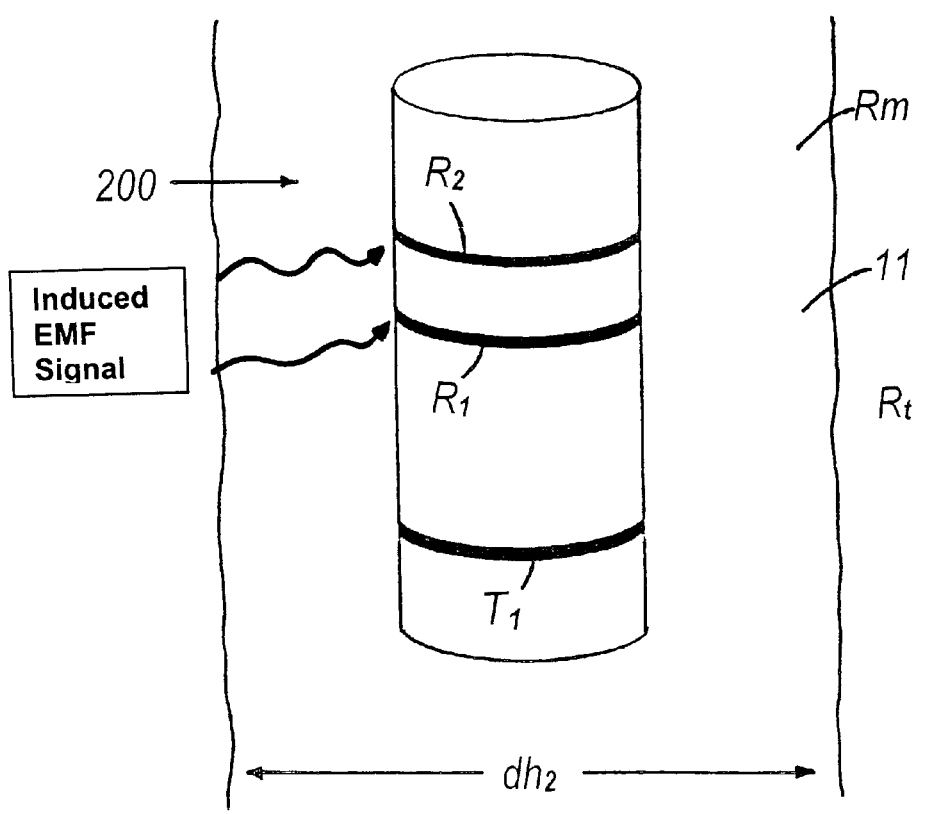
FIG. 4 shows the sensor of FIG. 3 in the same wellbore where the diameter has enlarged.

Referring to FIG. 4, the sensor 200 is shown passing through the same formation 9 at a later time. At this later time, the wellbore 11 has been enlarged ("washed out") by, among other things, erosion caused by fluid flow in the wellbore 11. The washed out section of the wellbore 11 has a new diameter indicated by $dh_2$. Because the formation 9 has not changed, however, the formation resistivity Rt will be substantially the same as at the first measurement time (such as shown in FIG. 3). This is used in the invention to determine the new diameter $dh_2$ from another set of phase sum (or average) and phase difference measurements, such as by the method of the Best et al '400 patent, but wherein ambiguities in the value of formation resistivity Rt are resolved by having a determinable value of Rt from the earlier set of phase measurements. It is necessary to have the measurements of phase sum (average) and difference be depth correspondent in order for the method of the invention to work well. Methods for matching depth of well logging instrument measurements made at a first time to those made at a second time are well known in the art.

Figure 5:
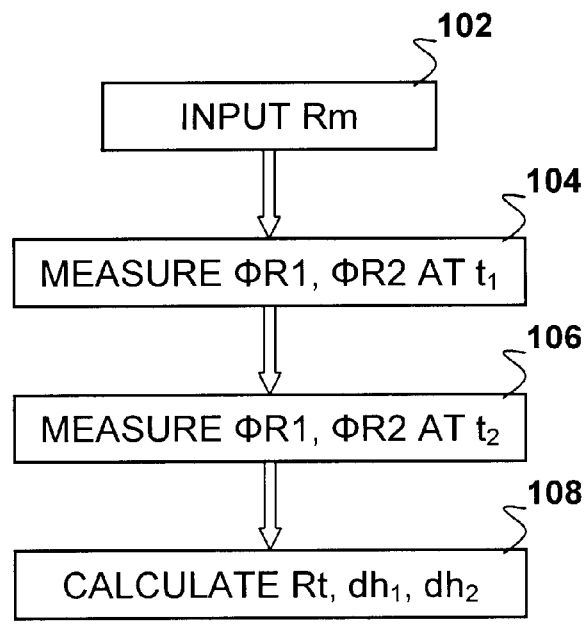
FIG. 5 shows a flow chart for one embodiment of the invention.

Referring to FIG. 5, one embodiment of the invention is shown in flow char form. The resistivity of the drilling fluid Rm is determined at the depth of the formation (9 in FIG. 3), as shown at 102. At a first time t1, values of phase $\phi$R1 and $\phi$R2 are measured at the receivers R1 and R2, respectively, as shown at 104. At a later time (such as shown in FIG. 4) the measurements of phase at R1 and R2 are measured again in the same earth formation, as shown at 106. Then using a technique such as described in the Best et al '400 patent, values of the wellbore diameter at t1, $dh_1$, and at t2, $dh_2$ are determined, as shown at 108. The value of Rt is also determined, wherein ambiguity in the value of Rt determined at later time t2 is resolved by using the value of Rt determined from the phase measurements made at t1.

Figure 6:
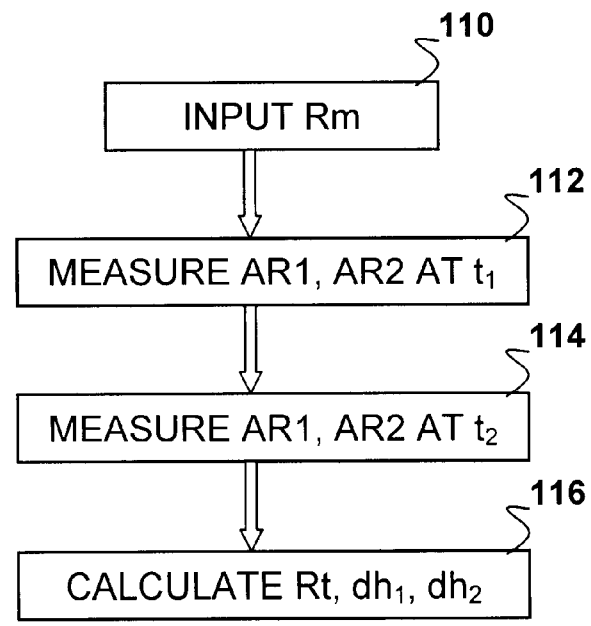
FIG. 6 shows a flow chart for another embodiment of the invention.

Referring to FIG. 6, an alternative embodiment of the invention will be explained. The instrument describe in the Clark et al '940 patent, as is the case for many LWD instruments, also makes measurements of the amplitude of the signal detected at the receivers (R1 and R2 in FIG. 2). The amplitudes can also be used to determine the wellbore diameter. The drilling fluid resistivity Rm is determined as in the previous embodiment of the invention, as shown at 110. Then, measurements of signal amplitude AR1 and AR2 are made at each of the receivers R1 and R2, respectively, at a first time t1 as shown at 112. The measurements of amplitude are repeated in the same earth formation at a later time t2, as shown at 114. Then the values of amplitude at t1 and at t2 are used to determine formation resistivity Rt and the diameter of the wellbore $dh_1$ and $dh_2$ at time t1 and t2, respectively. Any ambiguities in the value of Rt, such as may result from very large wellbore diameter, can be resolved by using the value of Rt determined from the amplitude measurements made at the earlier time t1.

It should be clearly understood that while the foregoing embodiments of the invention are described in terms of a well logging instrument having one transmitter and two receivers, any number of receivers may be used on any particular well logging instrument. Accordingly, the number of such receivers on any instrument used with the invention is not intended as a limitation on the invention. Furthermore, by the principle of reciprocity, an instrument, which has one receiver and at least two axially spaced apart transmitters, may be used with a method according to the invention. When such an instrument is used, one transmitter is energized, and a phase (and/or amplitude) is measured at the receiver. Then the other transmitter is energized and the phase of the phase (and/or amplitude) is measured at the receiver. A phase sum (or average) and phase difference can be determined just as for the multiple receiver instrument. The method of the invention can then be performed according to one of the foregoing embodiments.

In a practical implementation of the invention, a "first pass" set of measurements of phase (and/or amplitude) is made when the wellbore is initially drilled. Phase (and/or amplitude) at each receiver is ultimately correlated to the depth at which the measurements were made. At a later time, such as on a "bit trip" or "wiper trip", a second set of phase measurements can be made. The second set of measurements is depth matched to the first pass set. Then resistivity and wellbore diameters can be calculated according to the various embodiments of the invention.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for determining a diameter of a wellbore, comprising:

inducing an electromagnetic field in the wellbore and a formation surrounding the wellbore from a first location therealong;

measuring, at a first time, a phase, with respect to the field at the first location of a signal induced by the electromagnetic field at a second and at a third location axially spaced apart from the first location and from each other;

repeating the measuring at a second time; and determining a resistivity of the formation, and the wellbore diameter at the first time and at the second time from the measurements of phase made at the first and at the second times, wherein ambiguity in the resistivity is resolved by using resistivity determined from the measurements made at the first time.

2. The method as defined in claim 1 wherein the resistivity and diameter are determined by calculating a phase difference and a phase average between the phase measurements made at the second and third locations.

3. The method as defined in claim 1 wherein the resistivity and diameter are determined by calculating a phase difference and a phase sum between the phase measurements made at the second and third locations.

4. A method for determining a diameter of a wellbore, comprising:

inducing an electromagnetic field in the wellbore and a formation surrounding the wellbore from a first location therealong;

measuring, at a first time, a phase, with respect to the field at the first location of a signal induced by the electromagnetic field at a second location axially spaced apart from the first location;

inducing an electromagnetic field in the wellbore and a formation surrounding the wellbore from a third location axially spaced apart from the first and second locations;

repeating the measuring;

repeating the inducing at the first location, measuring, inducing at the third location and measuring at a second time; and determining a resistivity of the formation, and the wellbore diameter at the first time and at the second time from the measurements of phase made at the first and at the second times, wherein ambiguity in the resistivity is resolved by using resistivity determined from the measurements made at the first time.

5. The method as defined in claim 4 wherein the resistivity and diameter are determined by calculating a phase difference and a phase average between the phase measurements made by the inducing from the first and third locations.

6. The method as defined in claim 4 wherein the resistivity and diameter are determined by calculating a phase difference and a phase sum between the phase measurements made by the inducing from the first and third locations.

7. A method for logging a wellbore, comprising:

inducing an electromagnetic field in the wellbore and a formation surrounding the wellbore from a first location along the instrument while moving the well logging instrument along the wellbore;

measuring a phase, with respect to the field at the first location of a signal induced by the electromagnetic field at a second and at a third location axially spaced apart from the first location and from each other along the instrument while moving the instrument along the wellbore;

repeating, at a second time, the inducing and measuring while moving the instrument along the wellbore;

depth matching the measurements made at the first time and at the second time; and determining a resistivity of the formation, and the wellbore diameter at the first time and at the second time from the measurements of phase made at the first and at the second times, wherein ambiguity in the resistivity is resolved by using resistivity determined from the measurements made at the first time.

8. The method as defined in claim 7 wherein the resistivity and diameter are determined by calculating a phase difference and a phase average between the phase measurements made at the second and third locations.

9. The method as defined in claim 7 wherein the resistivity and diameter are determined by calculating a phase difference and a phase sum between the phase measurements made at the second and third locations.

10. A method for logging a wellbore, comprising:

inducing, at a first time, an electromagnetic field in the wellbore and a formation surrounding the wellbore from a first location along the instrument while moving the instrument along the wellbore;

measuring a phase, with respect to the field at the first location of a signal induced by the electromagnetic field at a second location axially spaced apart from the first location and from each other along the instrument while moving the instrument along the wellbore;

inducing, substantially at the first time, an electromagnetic field in the wellbore and a formation surrounding the wellbore from a third location along the instrument axially spaced apart from the first and second locations while moving the instrument along the wellbore;

repeating the measuring the phase;

repeating, at a second time, the inducing from the first location and measuring, the inducing from the third location and measuring;

depth matching the measurements made at the first and second times; and determining a resistivity of the formation, and the wellbore diameter at the first time and at the second time from the measurements of phase made at the first and at the second times, wherein ambiguity in the resistivity is resolved by using resistivity determined from the measurements made at the first time.

11. The method as defined in claim 10 wherein the resistivity and diameter are determined by calculating a phase difference and a phase average between the phase measurements made by the inducing from the first and third locations.

12. The method as defined in claim 10 wherein the resistivity and diameter are determined by calculating a phase difference and a phase sum between the phase measurements made by the inducing from the first and third locations.

13. A method for determining a diameter of a wellbore, comprising:

inducing an electromagnetic field in the wellbore and a formation surrounding the wellbore from a first location therealong;

measuring, at a first time, an amplitude of a signal induced by the electromagnetic field at a second and at a third location axially spaced apart from the first location and from each other;

repeating the measuring at a second time; and determining a resistivity of the formation, and the wellbore diameter at the first time and at the second time from the measurements of amplitude made at the first and at the second times, wherein ambiguity in the resistivity is resolved by using resistivity determined from the measurements made at the first time.

14. The method as defined in claim 13 wherein the resistivity and diameter are determined by calculating an amplitude difference and amplitude average between the amplitude measurements made at the second and third locations.

15. The method as defined in claim 13 wherein the resistivity and diameter are determined by calculating an amplitude difference and an amplitude sum between the phase measurements made at the second and third locations.

* * * * *